(No Model.)
F. W. JENKINS.
APPARATUS FOR OPERATING THE VALVES OF STEAM AND OTHER ENGINES.
No. 260,398. Patented July 4, 1882.
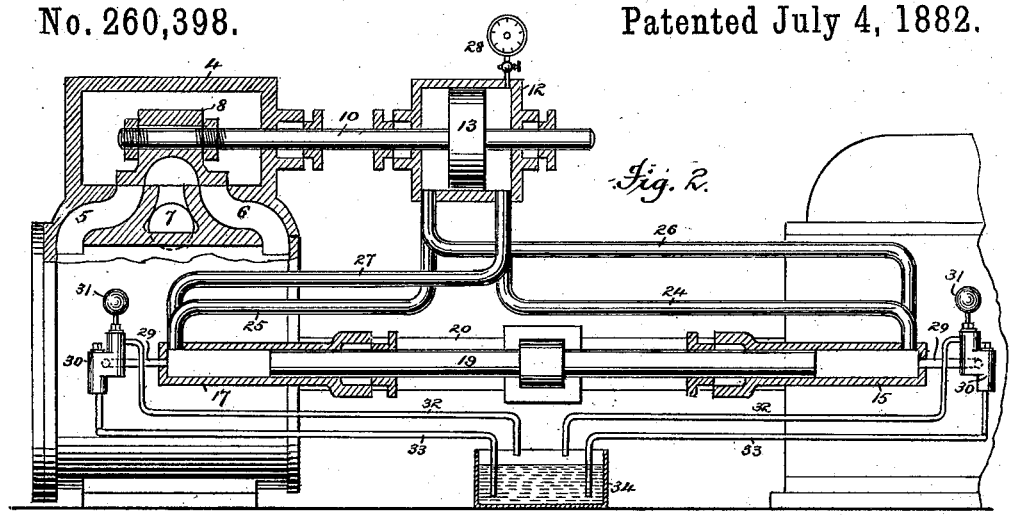
Fig. 2.
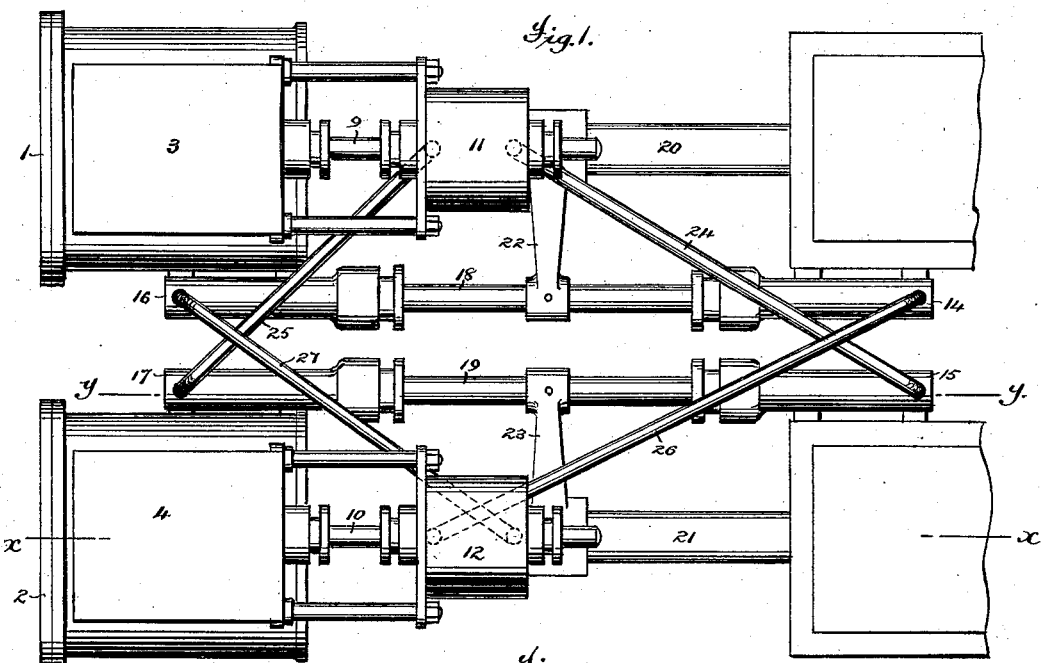
Fig. 1.
Fig. 3.
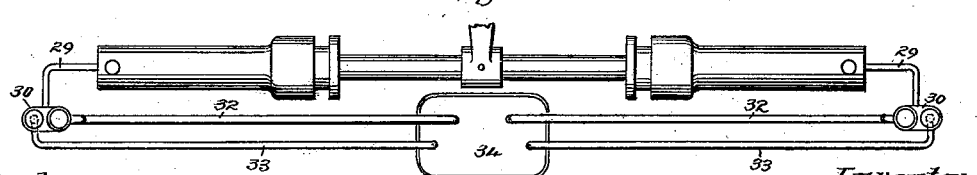
Attest:
G. H. Graham
A. N. Jasbera
Inventor,
Frank W. Jenkins,
by Munson & Philipp
Attys

UNITED STATES PATENT OFFICE.

FRANK W. JENKINS, OF BROOKLYN, NEW YORK.

APPARATUS FOR OPERATING THE VALVES OF STEAM AND OTHER ENGINES.

SPECIFICATION forming part of Letters Patent No. 260,398, dated July 4, 1882.

Application filed March 17, 1882. (No model.)

*To all whom it may concern:*

Be it known that I, FRANK W. JENKINS, a citizen of the United States, residing in the city of Brooklyn, county of Kings, and State of New York, have invented certain new and useful Improvements in Apparatus for Operating the Valves of Steam and other Engines, fully described and represented in the following specification and the accompanying drawings, forming a part of the same.

It is the object of the present invention to avoid the use of the cumbersome and expensive mechanisms consisting of levers, links, rock-shafts, gearing, &c., which have heretofore been employed to operate the valves for controlling the passage of steam or other fluid to and from the cylinders of engines.

To that end the invention consists broadly in the use of a confined column of fluid for communicating motion from some moving part of the engine to said valve or valves.

The invention also embraces certain details of construction and combinations of parts, all of which will be hereinafter fully explained and pointed out.

In said drawings, Figure 1 is a plan view of a duplex pumping-engine embodying the present invention. Fig. 2 is a longitudinal vertical section upon the lines $x$ $x$ and $y$ $y$ of Fig. 1. Fig. 3 is a plan view of certain details to be hereinafter referred to.

The engine proper is of a common construction and requires no specific description. It consists of the cylinders 1 2, provided with steam-chests 3 4, said parts being provided with the usual ingress and egress ports, 5 6 7, which are controlled by sliding valves 8, operated by valve-rods 9 10, passing through packing-boxes in the walls of the steam-chests.

In engines as heretofore constructed these valve-rods have been connected with and received motion from some moving part of the engine, such connection being made by means of a variety of mechanical devices, such as levers, links, rock-shafts, gearing, eccentrics, &c., as before stated. In the present invention, however, the use of these cumbersome and expensive devices is avoided by communicating motion from any convenient moving part of the engine to the valve-rods through a confined column of fluid, which I term a "hydraulic-link" or "water-rod." To accomplish this the outer ends of the valve-rods enter or pass through small cylinders 11 12, and are secured to pistons, as 13, working in said cylinders, said cylinders being supported in any convenient manner in proper position at the ends of the steam-chests.

The ends of the cylinders 11 12 are connected by pipes 24 25 26 27 with four small cylinders, 14 15 16 17, located between the two engines, and in which work the double plungers 18 19, which are connected through the cross-heads 22 23 with the piston-rods 20 21 of the engines.

The order in which the cylinders are connected by the pipes will be varied according as it is desired to have the valves move in the direction of the engine, or vice versa; but in order to secure the proper movement of the valves in an engine of the class shown they will be connected as follows:

Pipes 24 25 will connect the outer ends of cylinders 15 17 with the corresponding ends of cylinder 11, and pipes 26 27 will connect the outer ends of cylinders 14 16 with the opposite ends of cylinder 12. This arrangement, as will be observed, causes the pipes 26 27 to cross each other and the pipes 24 25.

The cylinders 11 12 14 15 16 17 and their connecting-pipes being filled with a suitable fluid, which it is to be observed should be of a character to be nearly or quite non-compressible, water, oil, alcohol, and glycerine being among the substances best suited for the purpose, and the engine being put in motion, the operation of the parts just described will be as follows:

The piston of cylinder 2 in moving to the right will, through piston-rod 21 and cross-head 23, force plunger 19 into cylinder 15, thereby forcing some or all of the fluid in said cylinder through pipe 24 into cylinder 11, thereby moving the piston of that cylinder and the valve of steam-chest 3 to the left, by which port 6 is opened. The piston of cylinder 1 will then commence moving to the left, and as it does so will, through piston-rod 20 and cross-head 22, force plunger 18 into cylinder 16, thereby forcing some or all of the fluid in said cylinder through pipe 27 into cylinder 12, and consequently moving piston 13 of that cylinder and valve 8 of steam-chest 4 to the left, and opening port 6 will reverse the piston of cylinder 2. The piston of cylinder 2 in moving to the left will in like manner reverse the piston of cylinder 1, and so the operation will continue to be repeated.

It will be readily understood that as the plunger 19 passes into cylinder 15 and forces the fluid in said cylinder and pipe 24 into cylinder 11, it will be withdrawn a like distance from cylinder 17, so that the fluid upon the opposite side of the piston in cylinder 11 will readily pass through pipe 25 into cylinder 17, and thus afford room for the advancing piston. When the plunger 19 is reversed the fluid will in like manner pass from cylinder 11 into cylinder 15. The operation of plunger 18, in connection with cylinders 12, 14, and 16, will of course be the same.

It will thus be seen that the motion of the piston-rods of the engine is communicated to the valve-rods by the simple oscillations of the hydraulic link or water-rod consisting of the confined column of fluid, and that all mechanical devices for transmitting the motion and changing its direction and amount are dispensed with.

In a duplex-valve motion like that shown in the present case it is necessary, in order to maintain a uniform and continuous action, that the piston of one of the cylinders, as 1, should move the valve of the other cylinder, as 2, so as to correspond as to time and direction with its own movements, but that the piston of the other cylinder, as 2, should move the valve of the first, as 1, so as to correspond in time with its own movements, but be the reverse in direction. This result is readily attained by crossing the tubes 26 27, as already explained, and shown in the drawings.

When the plungers 18 19 have a stroke equal to the stroke of the engine, as in the case shown, the amount of movement of the valve-rods is determined by the relative size of the plungers 18 19 and pistons 13, for, as will readily be seen, the smaller the plungers the less the displacement of the fluid and consequent movement of the pistons, and vice versa.

The stroke of the valve-rods may also be controlled by withdrawing a portion of the fluid from the pipes and cylinders, so that the fluid displaced by the plungers during the first part of the stroke will be required to fill the cylinder.

As the pistons will not move until the cylinders are filled, they will remain idle during a greater or less portion of the stroke of the engine, according to the amount of the fluid withdrawn.

The cross-heads 22 23 may also be arranged so as to slide upon the plungers 18 19 for a portion of the stroke, if it is desired.

It is often desirable, in order to know whether or not the valves are working properly, to ascertain the exact amount of power used to move them. In the present invention this can be readily accomplished by the use of an ordinary pressure-gage, 28, attached to cylinders 11 12, so as to indicate the pressure of the fluid in said cylinders, which pressure will of course indicate the power required to move the valves.

In order to compensate for any possible leakage from the cylinders 11 12 14 15 16 17, owing to defective packing, and to prevent the bursting of the pipes in case either or both the pistons in cylinders 11 12 should by any means get out of proper position, so as to be brought against one end of the cylinder before the plunger has completed its stroke, and at the same time to restore the pistons to their proper positions, each one of the cylinders 14, 15, 16, and 17 is connected by a pipe, 29, with a valve-chamber, 30. These chambers 30 have two outlets, which are connected by pipes 32 33 with a small tank or vessel of fluid, 34. One of the outlets of these valve-chambers is controlled by valves which open outward and the other by valves which open inward. The valves which open outward are controlled by weights 31. From this arrangement it results that the plungers 18 19, acting as pumps, will draw fluid through pipes 33 past the inwardly-opening valves, so as to keep the cylinders and pipes constantly filled, and should the pistons in cylinders 11 12 get out of proper position, so that too much fluid would be upon one side, the weighted outwardly-opening valve will be raised and afford relief, so as to prevent the bursting of the pipe, and the opposite cylinder will at the same time take additional fluid, so that at the next stroke the piston will be restored to its proper position. The weights 31 will of course be of sufficient size to hold the valves closed against the pressure required to move the valve-rods 9 10.

The plungers 18 19 need not be operated directly from the piston-rods 20 21, but may be connected with any moving part of the engine.

The location of the cylinders 14 15 16 17 may also be greatly varied to adapt the invention to engines of different designs.

Although the pistons of the cylinders 11 12 are here shown as arranged to operate sliding valves, yet it is evident that these pistons may be connected with and operate valves of other constructions equally well.

As will be readily understood, the present invention can be applied to single as well as duplex engines.

What I claim is—

1. The combination, with the cylinder of a steam or other engine and the valve for controlling the ingress and exhaust ports thereof, of a confined column of fluid for transmitting motion from some moving part of the engine to said valve, substantially as described.

2. The combination, with the valve-rod, cylinder, and piston, of a column of fluid connecting said piston with some moving part of the engine, substantially as described.

3. The combination, with the valve-rod, cylinder, and piston, of a column of fluid connecting opposite sides of said piston with moving parts of the engine, substantially as described.

4. The combination, with the valve-rod, cylinder, and piston, as 10 12 13, of the pipes, as 26 27, cylinders and plungers, as 14 16 18, and means for operating the plungers, substantially as described.

5. In a duplex-engine, the combination, with the valve-rods, of two cylinders, as 11 12, provided with pistons, as 13, four cylinders, as 14 15 16 17, pipes, as 24 25 26 27, plungers, as 18 19, and means for operating said plungers, substantially as described.

6. In a duplex engine, the combination of the valve-rods, cylinders, as 11 12, having pistons, as 13, and column of fluid connecting the said pistons with moving parts of the engine, substantially as described.

7. The combination, with the valve-rod, cylinder, and piston, as 10 12 13, of the pipes, as 24 25, cylinders and plungers, as 15 17 19, and means for keeping said cylinders and pipes constantly filled and for equalizing the amount of fluid on each side of the piston 13, all substantially as described.

8. The combination, with the valve-rod, cylinder, and piston, as 10 12 13, of the pipes, as 24 25, cylinders and plungers, as 15 17 19, pipes, as 29, and valve-chambers, as 30, connected with a supply-tank, substantially as described.

In testimony whereof I have hereunto set my hand in the presence of two subscribing witnesses.

FRANK W. JENKINS.

Witnesses:
J. A. HOVEY,
T. H. PALMER.